(12) United States Patent
Oberdorfer et al.

(10) Patent No.: US 10,473,252 B2
(45) Date of Patent: Nov. 12, 2019

(54) LINE CONNECTOR AND LINE SET FOR FLUID MEDIA

(71) Applicant: VOSS Automotive GmbH, Wipperfurth (DE)

(72) Inventors: Alexander Oberdorfer, Radevormwald (DE); Jochem-Andreas Hess, Wipperfurth (DE); Roland Klein, Wipperfurth (DE); Eugen Heinrichs, Gummersbach (DE); Sascha Rosenfeldt, Wipperfurth (DE)

(73) Assignee: VOSS Automotive GmbH, Wipperfurth (DE)

( * ) Notice: Subject to any disclaimer, the term of this patent is extended or adjusted under 35 U.S.C. 154(b) by 890 days.

(21) Appl. No.: 14/898,018

(22) PCT Filed: Jun. 13, 2014

(86) PCT No.: PCT/EP2014/062413
§ 371 (c)(1),
(2) Date: Dec. 11, 2015

(87) PCT Pub. No.: WO2014/198915
PCT Pub. Date: Dec. 18, 2014

(65) Prior Publication Data
US 2016/0116095 A1  Apr. 28, 2016

(30) Foreign Application Priority Data

Jun. 14, 2013  (DE) .......................... 10 2013 106 217

(51) Int. Cl.
*F16L 39/00* (2006.01)
*F16L 7/00* (2006.01)
(Continued)

(52) U.S. Cl.
CPC ............. *F16L 39/005* (2013.01); *F16L 53/32* (2018.01); *F16L 7/00* (2013.01); *F16L 37/56* (2013.01); *F16L 39/04* (2013.01); *F16L 39/06* (2013.01)

(58) Field of Classification Search
CPC ... F16L 7/00; F16L 39/00; F16L 51/00; F16L 55/26; F16L 58/18; F16L 27/0849;
(Continued)

(56) References Cited

U.S. PATENT DOCUMENTS 3,195,564 A * 7/1965 Carney ................... F16K 49/00
137/375
3,316,931 A * 5/1967 Elrod .................... F16L 59/141
137/339
(Continued)

*Primary Examiner* — Anna M Momper
*Assistant Examiner* — William S. Choi
(74) *Attorney, Agent, or Firm* — Eric J. Sosenko; Jonathan P. O'Brien; Honigman LLP

(57) ABSTRACT

A line connector with two mutually separate flow paths for the connection of a pipe-in-pipe line. The line connector has an inner connecting element for connecting to an inner pipe of the pipe-in-pipe line, an outer connecting element for connecting to an outer pipe of the pipe-in-pipe line, a first attachment element for attachment of the first line to the inner pipe, and a second attachment element for attachment of the second line to the outer pipe. The inner connecting element and the first attachment element are integrally formed on a separate attachment part. The outer connecting element is integrally formed on a separate pipe adapter part. And, the second attachment element is integrally formed on a separate connecting sleeve. The connecting sleeve permits at both sides, in the unassembled state, being pushed over the outer pipe. The invention also relates to a line set including the line connector.

20 Claims, 6 Drawing Sheets

(51) Int. Cl.
*F16L 37/56* (2006.01)
*F16L 39/04* (2006.01)
*F16L 39/06* (2006.01)
*F16L 53/32* (2018.01)

(58) Field of Classification Search
CPC ....... F16L 39/005; F16L 41/08; F16L 41/021; F16L 37/56; F16L 37/10; F16L 39/04; F16L 39/06
USPC ..... 285/18, 120.1, 123.1, 397, 123.2, 123.3, 285/133.11, 190, 325, 103, 904, 121.1, 285/121.2, 121.3
See application file for complete search history.

(56) References Cited

U.S. PATENT DOCUMENTS

| | | | |
|---|---|---|---|
| 3,986,732 A | 10/1976 | Stanley | |
| 4,194,767 A * | 3/1980 | McCracken | F16L 39/04 285/121.2 |
| 4,708,371 A * | 11/1987 | Elsworth | F16L 37/10 285/120.1 |
| 4,934,744 A * | 6/1990 | Samera, Jr. | F16L 39/04 285/121.3 |
| 5,456,502 A * | 10/1995 | Sharp | F16L 39/005 138/114 |
| 5,628,532 A * | 5/1997 | Ashcraft | F16L 9/18 285/123.15 |
| 5,681,063 A * | 10/1997 | Bressner | A61M 39/1011 285/123.1 |
| 6,550,815 B2 * | 4/2003 | Zitkowic, Jr. | F16L 37/144 285/120.1 |
| 6,682,102 B1 * | 1/2004 | Betz | F16L 39/005 285/123.1 |
| 7,052,047 B1 * | 5/2006 | Box | F16L 37/248 285/123.15 |
| 7,584,764 B2 * | 9/2009 | Maldavs | F16L 37/34 137/15.18 |
| 9,702,492 B2 * | 7/2017 | Borgmeier | F16L 39/005 |
| 2003/0034648 A1 | 2/2003 | Zitkowic et al. | |
| 2007/0241560 A1 * | 10/2007 | Malone | F16L 9/19 285/319 |
| 2011/0241333 A1 * | 10/2011 | Borgmeier | F16L 39/005 285/132.1 |
| 2013/0207383 A1 * | 8/2013 | Sixsmith | F16L 39/005 285/123.3 |

* cited by examiner

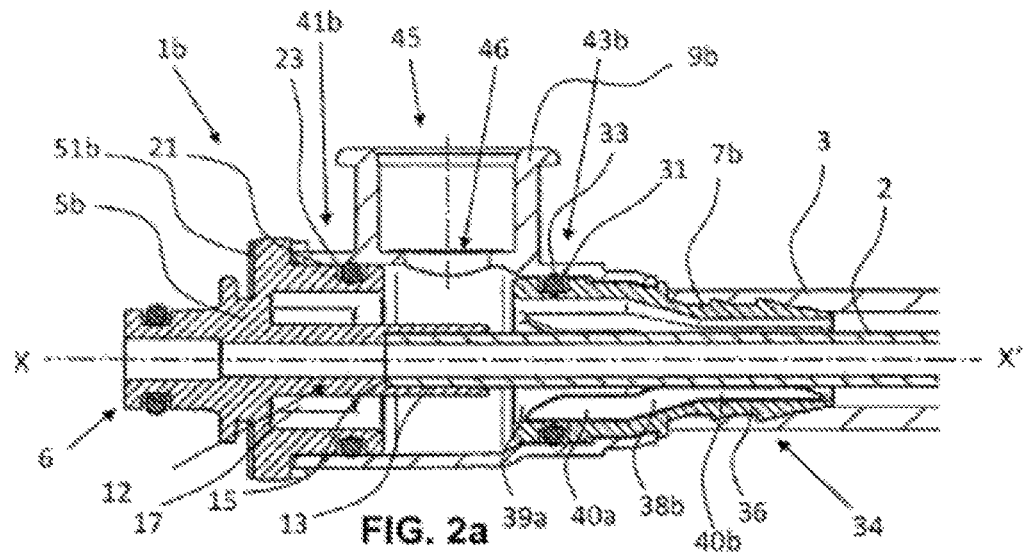
FIG. 2a
FIG. 2b
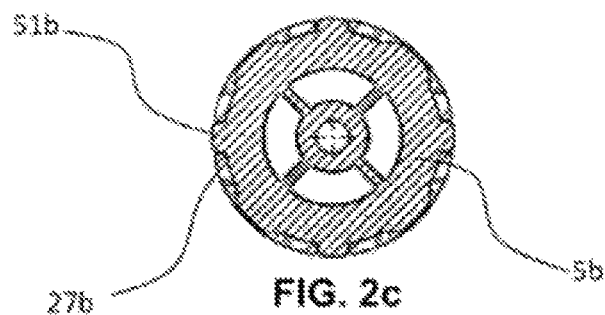
FIG. 2c

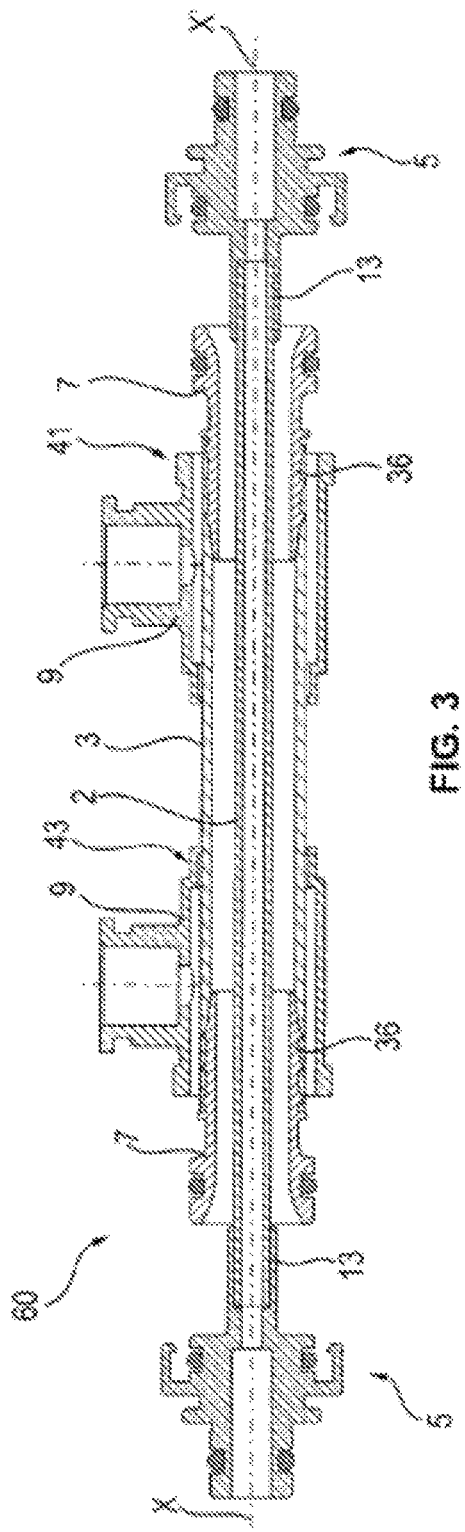
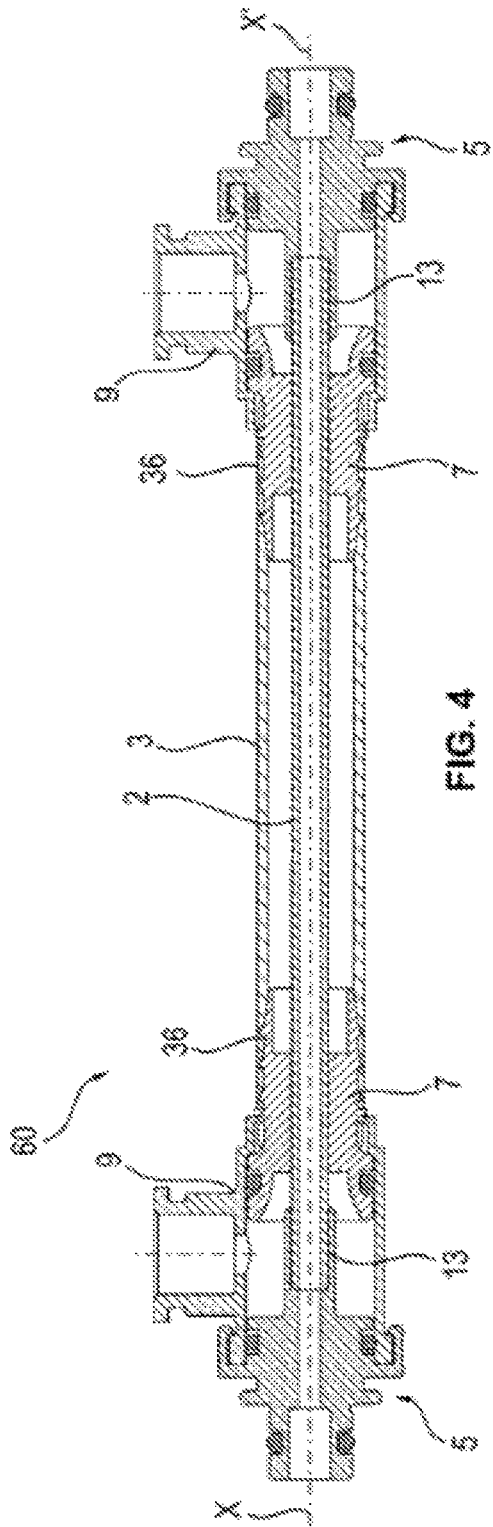

LINE CONNECTOR AND LINE SET FOR FLUID MEDIA

CROSS-REFERENCE TO RELATED APPLICATIONS

This application is the U.S. national phase of PCT Application No. PCT/EP2014/062413 filed on Jun. 13, 2014, which claims priority to DE 10 2013 106 217.2 filed on Jun. 14, 2013, the disclosures of which are incorporated in their entirety by reference herein.

TECHNICAL FIELD

The present invention relates to a line connector with two mutually separate flow paths for connecting a pipe-in-pipe line having a first line, in particular for a functional medium, and a second line, in particular for a temperature control medium.

Furthermore, the invention relates to a line set having a pipe-in-pipe line and at least one line connector.

BACKGROUND

Such customarily used lines and line connectors are known from WO 2009/053227 A1. For example, they are used in automotive technology, in particular with Diesel engines in so-called SCR catalytic converter systems (SCR=selective catalytic reduction), wherein an aqueous solution, for example, 32.5% urea solution is used as $NO_x$ reducing agent. At the same time, it involves the well-known problem that because of its freezing point of approximately −11° C. such urea-water solution requires special measures to prevent freezing in the event of low ambient temperatures, in order to ensure that the SCR catalyst is functioning even at low ambient temperatures.

When pipe-in-pipe applications are used in connection with media that are not allowed to mix a specific separation of both circuits has to be provided. For example, a firmly bonded connection is produced by means of laser welding. To produce a welded connection, in particular by means of laser welding, free access to the connection area is required. This presents a problem especially when connecting the inner pipe with the connecting elements of the line connector, especially when the outer pipe consists of a material that cannot be compressed in axial direction, or only to a certain extent.

SUMMARY

The present invention is based on the objective to improve a line connector of the type described above in such a way that it has a simple design and can be produced in an easy and cost-effective manner. In addition, the line connector has to have excellent functional properties, especially with regard to an easy and quick connection of the lines required for the two media.

According to the invention, this is achieved by means of a line connector in which the inner connecting element and the first attachment element are integrally formed on a separate attachment part, the outer connecting element is integrally formed on a separate pipe adapter part, and the second attachment element is integrally formed on a separate connecting sleeve, wherein, in the assembled state, the connecting sleeve connects the attachment part to the pipe adapter part, and wherein the connecting sleeve is designed in such a way that, in the unassembled state, it can at both sides be pushed over the outer pipe, and the end facing toward the attachment part can be pushed over the pipe adapter part and onto the attachment part.

During the production of a line set, when connecting the inner pipe to the line connector, this allows for free access to the connection point of the inner pipe and, at the same time, an easy assembly of the line connector after connecting the inner pipe.

Preferably, between the attachment part and the pipe adapter part, in the region of front sides of the respective perimeter walls facing each other, a space is designed for producing a welded connection to be prepared between the inner connecting element and the inner pipe, wherein, in an unassembled state, the space can be accessed from the outside by pushing the connecting sleeve over the pipe adapter part in the direction of the outer pipe and, in an assembled state, the space is closed by pushing the connecting sleeve over the pipe adapter part onto the attachment part. In the unassembled state, this space makes it possible to bring a tool in close proximity for producing a firmly bonded connection, especially when the outer pipe consists of a rigid material and the pipe adapter and the outer pipe cannot be moved to the side.

At the same time, it is especially advantageous when the inner connecting element extends from the attachment part over the entire length of the space up to the opening of the pipe adapter part facing the attachment part. This allows for maximum use of the space for producing the firmly bonded connection between the connecting element and the inner pipe.

In a further embodiment of the invention, the inner connecting element comprises a sleeve-like connecting piece for inserting the inner pipe and consists, at least partially of a laser-transparent material. As a result, an especially simple and reliable bond can be formed by means of laser welding between the inner pipe and inner connecting element.

Further embodiments of the invention are included in the respective dependent claims and the following description.

BRIEF DESCRIPTION OF THE DRAWINGS

It is shown:

FIG. 2a is a longitudinal section of a second embodiment of an invention-based line connector with inserted inner pipe and an attached outer pipe, FIG. 2b is a lateral view of a second embodiment of an invention-based line connector according to FIG. 2a, FIG. 2c is a cross-section according to section D-D shown in FIG. 2b of the second embodiment of an invention-based line connector in the region of the latching lugs of the attachment part, FIG. 3 is a longitudinal section of an embodiment of an invention-based line set from a pipe-in-pipe line with two invention-based line connectors, in an unassembled state, FIG. 4 is a longitudinal section of an embodiment of an invention-based line set from a pipe-in-pipe line with two invention-based line connectors, in an assembled state.

In the different figures of the drawing identical parts are provided with the same reference numerals.

DETAILED DESCRIPTION

With regard to the subsequent description, it should be noted that the invention is not limited to the embodiments and, in this context, to all or several characteristics of the characteristic combinations described. Instead, each individual partial characteristic of the, or each, embodiment is of importance for the subject matter of the invention, even dissociated from all other partial characteristics described in this connection, as well as in combination with any characteristics of a different embodiment.

Figure 1A:
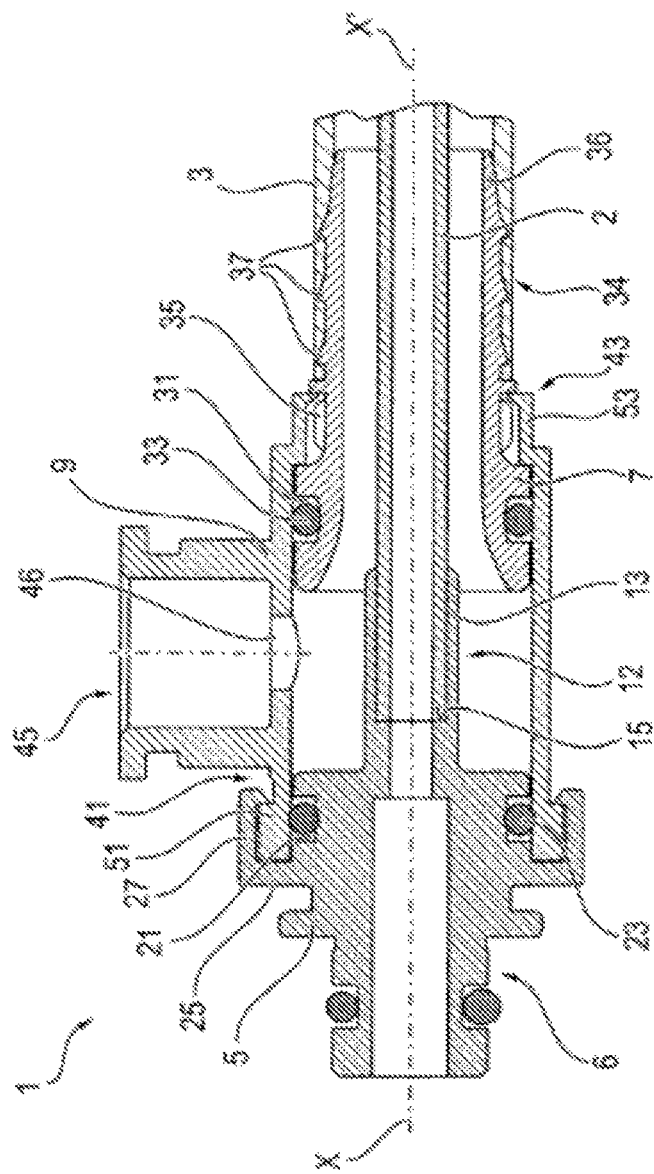
FIG. 1a is a first longitudinal section of an embodiment of an invention-based line connector with inserted inner pipe and attached outer pipe.
Figure 1B:
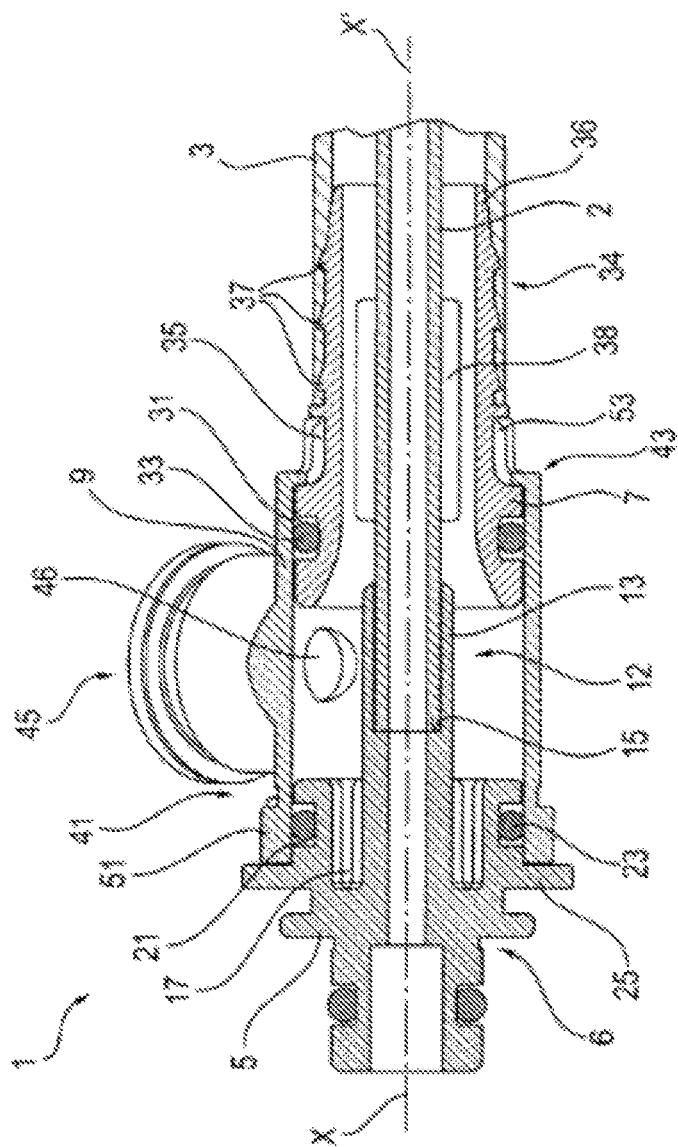
FIG. 1b is a second longitudinal section of an embodiment of an invention-based line connector with inserted inner pipe and an attached outer pipe.

FIG. 1a and FIG. 1b show a first embodiment of an invention-based line connector 1 in two longitudinal sections in different turning positions about its own longitudinal axis X-X'.

FIGS. 2a, 2b and 2c show a second embodiment of an invention-based line connector 1b.

The invention-based line connector 1, 1b is used in connection with pipe-in-pipe lines for a fluidic, in particular frost-prone functional medium, wherein the functional medium can be temperature controlled, or heated, if required even cooled, especially via a temperature control medium. In the process, the line connector 1, 1b is used for feeding the functional medium through the inner pipe 2 of the pipe-in-pipe line, as well as applying or discharging the temperature control medium, which preferably circulates in a closed loop, in an outer pipe 3 of the pipe-in-pipe line.

In a preferred application of the line connector 1, 1b, the functional medium involves a urea-water solution in an SCR catalytic converter system of a motor vehicle, wherein it is possible to use, for example, engine coolant (cooling water), as the temperature control medium.

In particular, the inner pipe 2 and/or the outer pipe 3 of the pipe-in-pipe line are designed in the form of smooth tubes, corrugated pipes, form-bent pipes or multilayer pipes, or in the form of a tube with a pressure carrier layer, wherein the materials comprise in particular ethylene-propylene diene rubber (EPDM), polyamides, for example, polyamide 12 (PA12) or polyphthalamides (PPA).

In particular, the inner pipe 2 has at least one barrier layer, of polypropylene (PP), polyethylene (PE) or fluorpolymeres, against ammonia permeation. Advantageously, the inner pipe 2 has an outer layer stabilized by hydrolysis, for example of PA12 or PPA. In a further embodiment, the inner pipe 2 has an AdBlue resistant inner layer, for example of PA12 or PPA.

In particular, the outer pipe 3 comprises also a layer stabilized by hydrolysis, consisting for example of PA12, PA66 or PPA. The outer pipe can consist also of EPDM.

In applications, in which particularly high temperatures of the functional medium or temperature control medium are reached, it is common to use PPA.

The invention-based line connector 1, 1b is used for connecting the pipe-in-pipe line with respectively fitting counterparts from a line for the functional medium, and in particular for a line for the temperature-control medium and comprises a separate attachment part 5, 5b, a separate pipe adapter part 7, 7b and a separate connecting sleeve 9, 9b which, in an assembled state, are connected with one another via the connecting sleeve 9, 9b.

In particular, the attachment part 5, 5b is used for connecting the inner pipe 2 with an attachment of a line for the functional medium, and on the side facing the line for the functional medium, it has an integrally formed first attachment element 6 with fitting fasteners and sealants. The first attachment element 6 can be designed to extend in parallel to the line connector axis X-X', as well as at an angle to the line connector axis X-X', forming a type of right-angled connector.

The attachment part 5, 5b is designed in the form of a hollow cylinder and on the side facing the inner pipe 2, it comprises an connecting element 12 for attaching the inner pipe 2. Advantageously, the connecting element 12 comprises a sleeve-like connecting piece 13, which has an inner diameter corresponding to the outer diameter of the inner pipe 2 so that the inner pipe 2 can be inserted into the connecting piece 13. In the interior, the connecting piece 13 is restricted in the direction of the counterpart by a ring wall 15. As a result, the ring wall 15 forms in axial direction a limit stop for the inserted inner pipe 2. In particular, the connecting element 12 forms one piece with the attachment part 5, 5b. The axial extension of the connecting element 12 is designed in such a way that the inner pipe 2 can be connected with the connecting element 12 by means of welding, preferably laser welding. For this purpose, the connecting element 12 consists, at least partially, of a laser-transparent material.

FIG. 1b and FIG. 2a show an advantageous embodiment of the attachment part 5, 5b, in which several ribs 17 running in axial direction and extending radially from the outer circumference of the connecting element 12 to the inner circumference of the attachment part 5 are arranged between the perimeter wall of the connecting element 12 and the perimeter wall of the attachment part 5, 5b. The temperature control medium flowing between the outer pipe 3 and the inner pipe 2 can flow in the spaces between the ribs, so that the heat transmission properties of the attachment part 5, 5b can be improved and the functional medium in the region of the connecting element 12 and, in addition, the attachment part 5, 5b can be temperature controlled.

Furthermore, on its outer circumference the attachment part 5, 5b comprises fasteners and sealants to form a seal with the connecting sleeve 9, 9b. In particular, the sealants of the attachment part 5, 5b comprise an annular groove 21 inserted in which is a seal 23 and extending around the outer circumference of the attachment part 5, 5b.

The fasteners of the attachment part 5, 5b comprise several securing means distributed along the outer circumference of the attachment part 5, 5b. As an alternative to the securing means, the fasteners can also consist of a firmly bonded connection.

In the first embodiment according to FIG. 1a, 1b, the fasteners are designed in the form of several connectors 27, which are attached on a bar 25 extending radially around the outer circumference of the attachment part 5 and in parallel to the line connector axis X-X' in the direction of the connecting sleeve 9. In particular, the connectors extend in such a way that they cover the annular groove 9 in radial direction. The end of the connecting sleeve 9 facing the attachment part 5 has fasteners that match the fasteners of the attachment part 5. As a result, the attachment part 5 and the connecting sleeve 9 can be connected with one another in sealing fashion.

In particular, the fasteners of the connecting sleeve 9 comprise several latching lugs 51 which are distributed at the outer circumference of the end of the connecting sleeve 9 facing the attachment part 5, wherein the latching lugs 51 are arranged and designed in such a way that, in the assembled state of the connecting sleeve 9, the connectors 27 of the attachment part 5 engage behind the latching lugs 51, wherein the perimeter wall of the connecting sleeve 9 interacts with the seal 23 of the attachment part 5.

In the second embodiment according to FIG. 2a, FIG. 2b and FIG. 2c, the fasteners are designed in the form of several locking latches 27b of the attachment part 5, which are located at the outer circumference of the connecting sleeve 9b and running in parallel to the line connector axis X-X' in the direction of the attachment part 5b. The locking latches 27b have an opening 28 which interacts with latching lugs 51b arranged at the outer circumference of the connector part 5b.

According to FIG. 2b and FIG. 2c, the securing means of the attachment part 5b or the connecting sleeve 9b are designed in such a way that they have an anti-rotation lock. The anti-rotation lock is formed by the latching lugs 51b, which in a locked state engage in the openings 28 of the locking latches 27b. In the locked state, the anti-rotation lock prevents the connector part 5b from being rotated toward the connecting sleeve 9b. In particular, the securing means are designed in such a way that they can be locked in different turning positions toward one another, in particular in four turning positions offset by 90°.

The pipe adapter part 7, 7b is also designed in the form or a hollow cylinder and has at its outer circumference on the side facing the attachment part 5, 5b sealants and fasteners to form a sealing connection with the connecting sleeve 9, 9b. In particular, the sealants comprise an annular groove 31 and a seal 33 inserted in the annular groove. At the same time, the outer circumference of the pipe adapter part 7, 7b is adapted to the inner circumference of the end of the connecting sleeve 9, 9b facing the pipe adapter part 7, 7b in such a way that the inner wall of the connecting sleeve 9, 9b interacts with the seal 33.

In particular, the fasteners of the pipe adapter part 7, 7b comprise a latching groove 35 arranged around the outer circumference for locking the fasteners of the connecting sleeve 9, 9b. The fasteners at the connecting sleeve 9, 9b and the pipe adapter part 7, 7b are designed in such a way that the connecting sleeve 9, 9b is supported in such a way that it can be rotated on the pipe adapter part 7, 7b. As an alternative to the locking process, the fasteners can also consist of a firmly bonded connection.

In addition, the pipe adapter part 7, 7b comprises an outer connecting element 34 for connecting the outer pipe 3 with the pipe adapter part 7, 7b. For this purpose, the side of the pipe adapter part 7, 7b facing away from the attachment part 5, 5b is designed in the form of an insertion stub 36, wherein in particular the insertion stub 36 has a toothed tube connection 37. For a connection with the pipe adapter part 7, 7b, the outer pipe 3 is pushed onto the insertion stub 36, wherein in particular the outer pipe 3 is fixed by the toothed tube connection 37. As an alternative to the insertion stub 36, the outer connecting element 34 of the pipe adapter part 7, 7b can also comprise a sleeve-like connecting piece, which has an inner circumference which is adapted to the outer circumference of the outer pipe 3, wherein the outer pipe 3 is inserted for fixing the connecting piece. At the same time, the perimeter wall of the connecting piece is designed at least partially in a laser-transparent manner so that the outer pipe can be also firmly bonded with the pipe adapter 7, 7b.

The inner circumference of the opening of the pipe adapter part 7, 7b facing the attachment part 5, 5b has a funnel-shaped design tapered from the outside to the inside.

In the second embodiment according to FIG. 2a, the opening of the pipe adapter part 7, 7b facing the attachment part 5, 5b has an expanded region 39a at the inner circumference compared to the inner circumference of the insertion stub 36. In particular, the expanded region 39a extends over an axial length which corresponds to the axial length of the connecting piece 13 of the attachment part 5b.

FIG. 1b and FIG. 2a show that preferably the pipe adapter part 7, 7b has several axially running supporting ribs 38, 38b, which extend radially to the inside, and which are distributed around the inner circumference of the pipe adapter part 7, 7b. In the first embodiment according to FIG. 1b, the supporting ribs 38 have a radial height, which is adapted to the outer diameter of the inner pipe 2, so that an inserted inner pipe 2 is guided in the center of the pipe adapter part 7.

In the second embodiment according to FIG. 2a, the supporting ribs 38b have two supporting areas 40a, 40b with different radial heights. At the same time, the first supporting area 40a facing the attachment part 5b is arranged in the expanded region 39a of the pipe adapter part 7b. In particular, the radial height of the supporting ribs 38b of the first supporting area 40a is adapted to the outer circumference of the connecting piece 13 of the attachment part 5b, so that the outer wall of the connecting piece 13 can be guided in the center of the first supporting area 40a. The radial height of the second supporting area 40b facing away from attachment part 5b is adapted to the outer diameter of the inner pipe 2, so that the supporting ribs 38b in the second supporting area 40b are guiding an inserted inner pipe 2 in the center of the pipe adapter part 7b.

The connecting sleeve 9, 9b has a hollow design and an opening 41, 41b at the end facing the attachment part 5, 5b for pushing onto the attachment part 5, 5b and at the other end it has an opening 43, 43b for pushing onto the pipe adapter part 7, 7b. At the ends between the two openings 41, 41b, 43, 43b, a second attachment element 45 is arranged which, via an opening 46 in the perimeter wall of the connecting sleeve 9, 9b, is fluid-connected with a passage of the connecting sleeve 9, 9b that connects the ends of both openings 41, 41b with one another. The second attachment element 45 is used to connect the outer pipe 3 with a connection of a line for the temperature control medium and has matching fasteners and sealants on the side facing the line of the temperature control medium.

The inner diameter of the opening 41, 41b facing the attachment part 5, 5b is adapted to the outer diameter of the attachment part 5, 5b in the region of the sealing groove 21, so that the inner wall of the connecting sleeve 9, 9b interacts with the seal 23.

In the second embodiment according to FIG. 2a, the outer diameter of the attachment part 5b in the region of the sealing groove 23 and the inner diameter of the opening 41b of the connecting sleeve 9b facing the attachment part 5b are larger than the outer diameter of the pipe adapter part 7b in the region of the sealing groove 31 and larger than the inner diameter of the opening 43b of the connecting sleeve 9b facing the pipe adapter part 7b. At the same time, the opening 46 of the connecting sleeve 9b opens into the region of the opening 41b with the larger inner diameter. This prevents the seal 33 of the pipe adapter part 7b from being damaged by the edges of the mouth of the opening 46 of the connecting sleeve 9b when pushing the connecting sleeve 9b over the pipe adapter part 7b.

The end of the connecting sleeve 9, 9b facing the pipe adapter part 7, 7b has fasteners that are matching the fasteners of the pipe adapter part 7, 7b. As a result, the pipe adapter part 7, 7b and the connecting sleeve 9, 9b are designed in such a way that the can form a sealing connection. The inner diameter of the opening 43, 43b facing the pipe adapter part 7, 7b is adapted to the outer diameter of the pipe adapter part 7, 7b in the region of the sealing groove 31. In particular, the fasteners comprise several locking latches 53 distributed at the circumference of the front end of the connecting sleeve 9, 9b facing the pipe adapter, wherein the locking latches 53 are arranged and designed in such a way that, in the assembled state of the connecting sleeve 9, 9b, the locking latches 53 engage in the latching groove 35 of the pipe adapter part 7, 7b, and wherein the perimeter wall of the connecting sleeve 9, 9b interacts with the seal 33 of the pipe adapter part 7, 7b. As an alternative to the securing means, the fasteners can consist also of a firmly bonded connection.

As a result, the connecting sleeve 9, 9b is designed in such a way that, in the unassembled state, it can at both sides be pushed over the outer pipe 3 and, with its end facing the attachment part 5, 5b, it can at one side be pushed over the pipe adapter part 7, 7b and onto the attachment part 5, 5b.

The axial length of the connecting sleeve 9, 9b and the axial length of the connecting element 12 of the attachment part 5, 5b are designed and adapted to one another in such a way that the space between the front end of the perimeter wall of the attachment part 5, 5b facing the perimeter wall of the pipe adapter part 7, 7b is sufficient for forming a connection between the inner pipe 2 and the connecting piece 13 by means of welding, in particular laser welding. In particular, the space is sufficient for inserting a welding tool and a retaining tool for the inner pipe 2 and bringing in close proximity of the connecting joints.

The attachment part 5, 5b, the pipe adapter part 7, 7b and the connecting sleeve 9, 9b are designed and arranged in such a way that through the space between the attachment part 5, 5b and the pipe adapter part 7, 7b a space is formed for producing a welded connection between the inner connecting element 12 and the inner pipe 2. In an unassembled state, the space can be accessed from the outside by pushing the connecting sleeve 9, 9b over the pipe adapter part 7, 7b in the direction of the outer pipe 3 and, in an assembled state, by pushing the connecting sleeve 9, 9b over the pipe adapter part 7, 7b onto the attachment part 5, 5b.

FIG. 3 and FIG. 4 show a pre-assembled line set 60, comprising a pipe-in-pipe line with, for example, two invention-based line connectors 1 of the first embodiment according to FIG. 1 and FIG. 2. The following descriptions for producing a line set 60 basically apply also to line sets 60 with line connectors 1b of the second embodiment according to FIG. 2a, FIG. 2b and FIG. 2c. The line set 60 is produced by the following procedural steps:

First, the outer pipe 3 is cut to the desired pre-assembled length. Then a pipe adapter part 7, 7b of the first line connector 1 is assembled at the first side of the outer pipe 3, in particular by being inserted with its insertion stub into the outer pipe 3. Subsequently, two connecting sleeves 9, 9b of both line connectors 1, 1b are pushed from the second end of the outer pipe 3 onto the outer pipe 3, wherein the connecting sleeve 9, 9b of the first line connector 1, 1b is pushed onto the outer pipe 3, starting with the opening 41, 41b facing the attachment part 5, 5b, and the connecting sleeve 9, 9b of the second line connector 1, 1b, starting with the opening 43, 43b facing the pipe adapter part 7, 7b. Then, the pipe adapter part 7, 7b of the second line connector 1, 1b is assembled at the second end of the outer pipe 3, in particular by inserting its insertion stub 36 into the outer pipe 3. Subsequently, the inner pipe 2 is pulled through both pipe adapter parts 7, 7b into the outer pipe 3.

Next, the attachment part 5, 5b of the first line connector 1, 1b is firmly connected with the first end of the inner pipe 2, in particular by means of welding, preferably laser welding. For this purpose, the first end of the inner pipe 2 is inserted into the connecting piece 13 of the attachment part 5, 5b. Since the second end of the inner pipe 2 is still free, the outer pipe 3 with the connected pipe adapter parts 7, 7b and the pushed on freely moving connecting sleeves 9, 9b can still be extensively pushed back over the inner pipe 2, so that there is sufficient space for bringing the welding tool and the retaining tool for the inner pipe 2 into close proximity of the connecting piece 13 of the attachment part 5, 5b of the first line connector 1, 1b.

When the first end of the inner pipe 2 has been firmly connected with attachment part 5, 5b of the first line connector 1, 1b, the outer pipe 3 with the pipe adapter part 7, 7b of the first line connecter 1, 1b can be pushed tightly onto the attachment part 5, 5b of the first line connector 1, 1b. Then, at the unassembled end, the inner pipe 2 is cut to its desired pre-assembled length, wherein the length of the inner pipe 2 corresponds to the length of the outer pipe 3 and the length of the parts of the inner pipe 2 that are inserted into the respective connecting pieces 13 of the attachment parts 5, 5b.

Next, the attachment part 5, 5b of the second line connector 1, 1b is firmly connected by means of welding, in particular laser welding, with the second end of the inner pipe 2. For this purpose, the second end of the inner pipe 2 is inserted into the connecting piece 13 of the attachment part 5, 5b of the second line connector 1. Since the pipe adapter part 7, 7b and the attachment part 5, 5b of the first line connector 1, 1b were firmly pushed against one another, in the assembled state, the space between the attachment part 5, 5b of the second line connector 1, 1b and the pipe adapter part 7, 7b of the second line connector 1, 1b is twice as long as the space between the attachment part 5, 5b and the pipe adapter part 7, 7b. As a result, there is sufficient space for bringing into close proximity a welding tool, in particular a laser welding tool, and a retaining tool for the inner pipe 2.

When both attachment parts 5, 5b are connected with the ends of the inner pipe 2, the outer pipe 3 is adjusted centrally above the inner pipe 2 and the connecting sleeves 9, 9b of the line connector 1, 1b are pushed over the respective pipe adapter parts 7, 7b and connecting pieces 13 of the attachment parts 5, 5b and connected, especially by securing means, with the attachment parts 5, 5b and the pipe adapter parts 7, 7b.

When, in the assembled state, the basic length of the space between the attachment part 5, 5b and the pipe adapter part 7, 7b is sufficient for bringing a welding tool in close proximity, a pre-assembled line set 60 can be produced on one end also with a customary line connector and on the other end with an invention-based line connector 1, 1b.

FIGS. 5 to 8 show four application examples for the invention-based line connectors 1, 1b and line sets 60 in an SCR catalytic converter system. These examples are especially appropriate, but it is also possible to use different systems and possibilities of combination which are not mentioned, as well as circuits using the invention-based line connectors 1, 1b and line sets 60.

Figure 5:
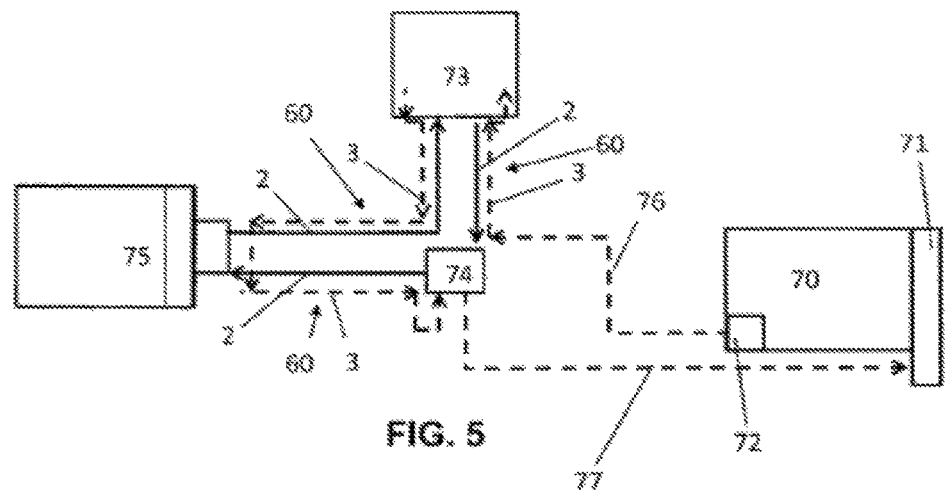
FIG. 5 is a diagram of an SCR catalytic converter system with pipe-in-pipe lines with invention-based line connectors in series connection.

FIG. 5 shows a diagram of an SCR catalytic converter system with invention-based pipe-in-pipe line sets 60 in series connection. The SCR catalytic converter system comprises several components connected with line sets 60, in particular an engine 70, which comprises a radiator 71 and a water cut-off valve 72, an SCR tank 73, a metering pump 74 and a catalytic converter 75. In this catalytic converter system, the SCR fluid is pumped from the SCR tank 73 by means of invention-based line sets 60, to the catalytic converter 75 by means of the metering pump 74 and from the catalytic converter 75 back to the SCR tank 73. In the process, the SCR fluid flows through the attachment parts 5, 5b and the inner pipe 2 of the line connector 1, 1b of the line sets 60. Initially, the SCR fluid flows from the SCR tank 73 through the attachment parts 5, 5b of the one line connector 1, 1b, the inner pipe 2 and the attachment part 5, 5b of the other line connector 1, 1b of the first line set 60 to the metering pump 74. Then, the SCR fluid flows from the metering pump 74 through the attachment parts 5, 5b of the one line connector 1, 1b, the inner pipe 2 and the attachment part 5, 5b of the other line connector 1, 1b of the second line set 60 to the catalytic converter 75. Subsequently, the SCR fluid flows from the catalytic converter 75 through the attachment parts 5, 5b of the one line connector 1, 1b, the inner pipe 2 and the attachment part 5, 5b of the other line connector 1, 1b of the third line set 60 back to the SCR tank 73.

At the same time, via the water shut-off valve, the cooling water of the engine 70 is guided by means of a feed line to the metering pump 74 and there connected with the one attachment element 45 of the one line connector 1, 1b, guided via the outer pipe 3 to the other line connector 1, 1b of the first line set 60, and via the other attachment element 45 to the SCR tank.

In particular, the cooling water is used for controlling the temperature of the SCR tank and subsequently by means of an attachment element 45 of a line connector 1,1b of the second line set 60 via the outer pipe 3 and the other attachment element 45 of the other line connector 1, 1b of the second line set 60 it is guided to the catalytic converter. In the embodiment shown, the catalytic converter 75 does not require direct temperature control, so that the attachment element 45 of the second line set 60 is directly connected with an attachment element 45 of the line connector 1, 1b of the third line set 60. Then the cooling water flows through the outside pipe 3 and the other attachment element 45 of the other line connector 1, 1b of the third line set 60 to the metering pump 45.

Preferably, the cooling water is then used for controlling the temperature of the metering pump 74 and subsequently guided via a return pipe 77 to the radiator 71. From the radiator 71 the cooling water flows back into the engine 70. In the line sets 60 the SCR fluid and the cooling water pass in opposite directions in the inner pipe 2 or outer pipe 3. However, it is also possible to let the cooling water flow in reversed or the same direction as the SCR fluid through the line sets 60.

As a result of the series connection, the entire volume flow of the SCR fluid or the cooling water is carried through the inner pipe 2 or outer pipe 3. The series connection has the advantage that only a few feed lines and manifolds are required.

Figure 6:
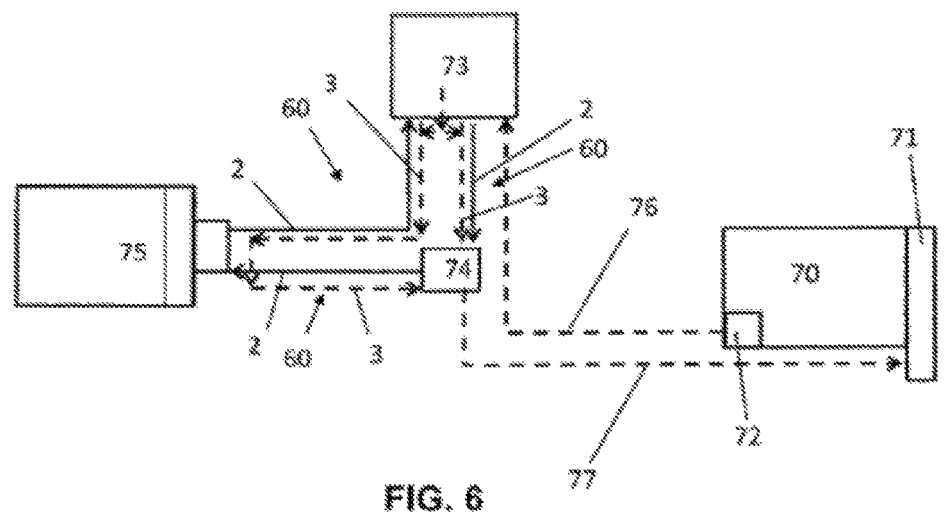
FIG. 6 is a diagram of an SCR catalytic converter system with pipe-in-pipe lines with invention-based line connectors in parallel connection.

FIG. 6 shows a diagram of an SCR catalytic converter system with invention-based pipe-in-pipe line sets 60 which have invention-based line connectors 1, 1b in parallel connection. In the SCR catalytic converter system with parallel connection the SCR fluid is pumped by means of invention-based line sets 60 from the SCR tank, by means of the metering pump 74 to the catalytic converter 75, and from the catalytic converter 75 back to the SCR tank, in the manner described above with regard to series connections.

At the same time, via the water shut-off valve 72, the cooling water of the engine 70 is guided by means of a feed line 76 to the SCR tank 73 and used for controlling the temperature of the SCR tank, and subsequently distributed into the first line set 60, as well as the third line set 60. As a result, the cooling water flows from the SCR tank into an attachment element of the one line connector 1, 1b and via the outer pipe 3 to the other line connector 1, 1b of the first line set 60 and to the metering pump 74.

Furthermore, through the attachment element 45 of a line connector 1, 1b of the third line set 60, the cooling water is guided via the outer pipe 3 and the other attachment element 45 of the other line connector 1, 1b of the third line set 60 to the catalytic converter 75. In the embodiment shown the catalytic converter 75 does not require direct temperature control, so that the attachment element 45 of the third line set 60 is directly connected with an attachment element 45 of the line connector 1, 1b of the second line set 60. Then the cooling water flows through the outer pipe 3 and the other attachment element 45 of the other line connector 1, 1b of the second line set 60 to the metering pump 45.

In particular, the cooling water is then used for controlling the temperature of the metering pump 74 and joined with the cooling water coming directly from the SCR tank 73 and subsequently guided via the return pipe 77 to the radiator 71. From the radiator 71, the cooling water flows back to the engine 70. In the first line set 60, the SCR fluid and the cooling water pass in the same direction in the inner pipe 2 or outer pipe 3. In the second and third line set 60 the SCR fluid and the cooling water pass in opposite directions in the inner pipe 2 or outer pipe 3.

As a result of the parallel connection, the volume flow of the cooling water is distributed in different line sets 60. Pressure losses are also reduced. As a result, it is possible to use smaller or more compact line sets 60, so that different volume flows or circuits are generated for the functional medium and the temperature control medium.

Figure 7:
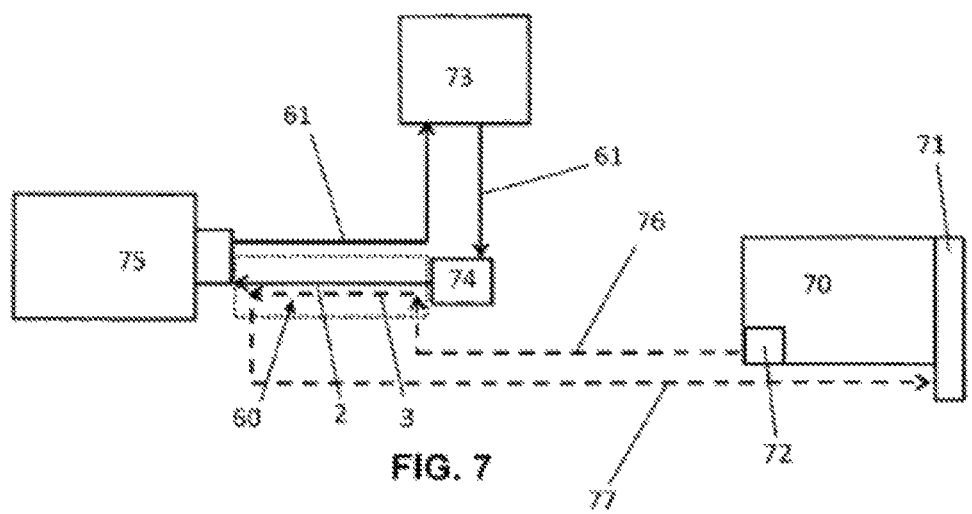
FIG. 7 is a diagram of an SCR catalytic converter system with pipe-in-pipe lines with invention-based line connectors in hybrid connection.

FIG. 7 shows a diagram of an SCR catalytic converter system with an invention-based pipe-in-pipe line set 60 having invention-based line connectors 1, 1b and well-known electrically heated line sets 61. In the SCR catalytic converter system with the hybrid circuit, the SCR fluid is initially guided by means of well-known electrically heated line sets 61 from the SCR tank 73 to the metering pump 74. Then, the SCR fluid flows from the metering pump 74 through the attachment parts 5, 5b of the one line connector 1,1b, the inner pipe 2 and the attachment part 5, 5b of the other line connector 1, 1b of the invention-based line set 60 to the catalytic converter 75. Subsequently, the SCR fluid flows from the catalytic converter 75 through a second well-known electrically heated line set 61 back to the SCR tank 73.

At the same time, via the water shut-off valve 72, the cooling water of the engine 70 is guided by means of a feed line 76 into the invention-based line set 60. As a result, the cooling water flows from the feed line 76 into an attachment element 45 of the one line connector 1, 1b and via the outer pipe 3 to the other line connector 1, 1b of the invention-based line set 60, and from there into the return pipe 77. It is also possible to exchange one of the other well-known line sets 61 for an invention-based line set 60 for an additional temperature control of the cooling water.

Basically, this makes it possible to use invention-based line sets 60 in combination with customarily used electric line sets 61. In addition, it is possible to specifically cool a line set 60 in a particularly hot zone of the SCR catalytic converter system, regardless of the heating capacity in other regions.

Figure 8:
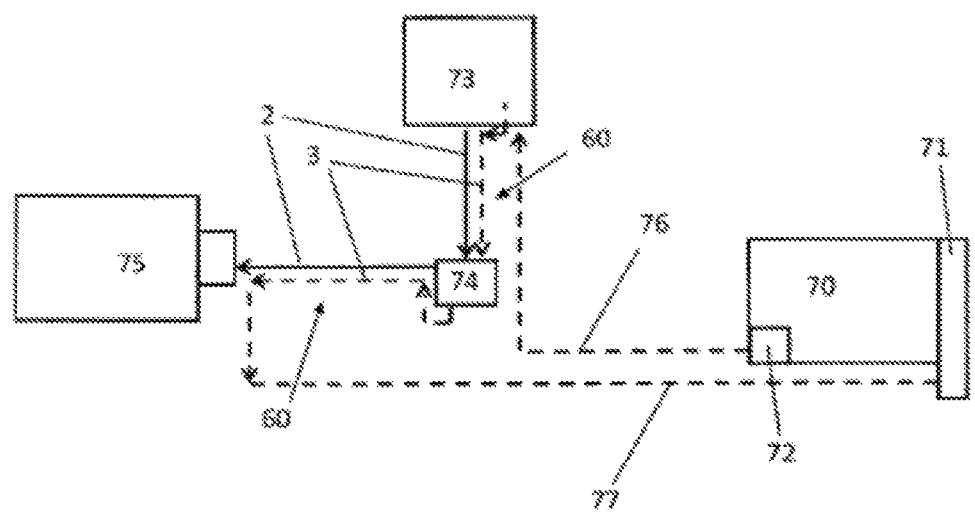
FIG. 8 is a diagram of an alternative SCR catalytic converter system with pipe-in-pipe lines with invention-based line connectors in series connection without SCR feedback to the tank.

FIG. 8 shows a diagram of a further SCR catalytic converter system with invention-based pipe-in-pipe line sets 69 having invention-based line connectors 1, 1*b* in series connection. In this SCR catalytic converter system, the SCR fluid is pumped by means of the invention-based line sets 60 from the SCR tank 73 and by means of the metering pump 74 to the catalytic converter 75, wherein no return flow to the SCR tank is required because, by means of a sensor control, the metering pump 74 controls the volume of the SCR fluid so precisely that no SCR fluid remains after it has been used in the catalytic converter 75.

Initially, the SCR fluid flows from the SCR tank 73 through the connection point 5, 5*b* of the one line connector 1, 1*b*, the inner pipe 2 and the attachment part 5, 5*b* of the other line connector 1, 1*b* of the first line set 60 to the metering pump 74. Then, the SCR fluid flows from the metering pump 74 through the attachment parts 5, 5*b* of the one line connector 1,1 *b*, the inner pipe 2 and the attachment part 5, 5*b* of the other line connector 1, 1*b* of the second line set 60 to the catalytic converter 75.

At the same time, via the water shut-off valve 72, the cooling water of the engine 70 is guided by means of a feed line 76 to the SCR tank 73 and there used for controlling the temperature of the SCR tank and, subsequently, through an attachment element 45 of a line connector 1, 1*b* of the second line set 60 it is guided via the outer pipe 3 and the other attachment element 45 of the other line connector 1, 1*b* of the second line set 60 to the metering pump 74, and there it is used to control the temperature of the metering pump 74. Then, the cooling water is guided from the metering pump 74 into an attachment element 45 of a line connector 1, 1*b* of the second line set 60 via the outer pipe 3 and the other attachment element 45 of the other line connector 1, 1*b* of the second line set 60 to the catalytic converter 75 and there directly via a return line 77 to the radiator 71. From the radiator, the cooling water flows back into the engine 70. In the line sets 60 the SCR fluid and the cooling water flow mutually in the inner pipe 2 or outer pipe 3. However, it is also possible to let the cooling water flow in reversed and opposite direction of the SCR fluid through the line sets 60.

In the embodiments according to FIG. 5, FIG. 6 and FIG. 8, the cooling water is used especially for controlling the temperature of the SCR tank 73 and the metering pump 74. However, it is also possible that the cooling water is not used in these components and, instead, the attachment elements 45 of the line connectors 1, 1*b* of the different line sets 60 are directly connected with one another. Along those same lines, it is also possible to supply the catalytic converter 75 with cooling water for controlling the temperature by means of a line set 60.

The invention is not restricted to the embodiments shown and described but comprises also all embodiments functioning in the sense of the invention. It is explicitly emphasized that the embodiments are not restricted to all characteristics in combination. Each individual characteristic can be separate from all other characteristics and be of importance for the invention. Furthermore, the invention is not yet restricted to the characteristic combination defined in Claim 1, but can be defined by any other combination of specific characteristics of all disclosed individual characteristics. This means that basically each individual characteristic of Claim 1 can be omitted or replaced by at least one individual characteristic disclosed at a different place of the application.

The invention claimed is:

1. A line connector with two mutually separate flow paths for connecting a pipe-in-pipe line to independent first and second lines, the line connector comprising:
   an attachment part, a pipe adapter part and a connecting sleeve as individual components;
   the attachment part including a first attachment element and an inner connecting element unitarily formed therewith, the inner connecting element being an inner cylindrical extension configured to engage an inner pipe of the pipe-in-pipe line, the first attachment element being a first cylindrical extension configured to engage the first line, and a flow path from the inner line to the first line being defined through the attachment part;
   the pipe adapter part including a unitarily formed outer connecting element being an outer cylindrical extension configured to engage an outer pipe of the pipe-in-pipe line; and
   the connecting sleeve including a second attachment element unitarily formed thereon as a second cylindrical extension arranged about an opening in a perimeter wall of the connecting sleeve, the second cylindrical extension being separate and distinct from the first attachment element and being configured to engage the second line and communicate the second line to a flow path of the outer pipe, the connecting sleeve connecting the attachment part to the pipe adapter part, and wherein the connecting sleeve is configured at both sides to, in the unassembled state, be pushed fully over the outer pipe, and at the end facing toward the attachment part be pushed over the pipe adapter part and onto the attachment part.

2. The line connector according to claim 1, wherein an access space is provided between the attachment part and the pipe adapter part and configured to provide access to the inner connecting element and the inner pipe for producing a welded connection,
   wherein, in an unassembled state, the access space can be accessed from the outside by pushing the connecting sleeve over the pipe adapter part in the direction of the outer pipe and, in an assembled state, and the access space can be closed by pushing the connecting sleeve over the pipe adapter part onto the attachment part.

3. The line connector according to claim 1, wherein the inner connecting element comprises a sleeve connecting piece configured to receive the inner pipe therein.

4. The line connector according to claim 3, wherein the inner connecting element is at least partially formed of a laser-transparent material.

5. The line connector according to claim 1, wherein a plurality of ribs extend in an axial direction and project radially from an outer circumference of the inner connecting element to an inner circumference of the attachment part, the ribs being arranged between a perimeter wall of the attachment part and the outer circumference of the inner connecting element.

6. The line connector according to claim 1, wherein the pipe adapter part includes a plurality of axially running supporting ribs, the supporting ribs extending radially inward and are distributed around an inner circumference of the pipe adapter part and have a radial height adapted to the outer diameter of the inner pipe.

7. A line connector according to claim 6, wherein the supporting ribs of the pipe adapter part have a supporting area in which a height of the supporting ribs is adapted to an outer circumference of the connecting piece of the attachment part, so that an outer wall of the connecting piece can be guided centrally in the supporting area.

8. The line connector according to claim 1, wherein in the assembled state, the attachment part and the connecting sleeve are securely connected with one another at least in axial and radial direction via a securement provided at a circumference of the attachment part and the connecting sleeve.

9. The line connector according to claim 8, wherein the securement at the connecting sleeve and the attachment part permit the connecting sleeve to be rotated freely on the attachment part.

10. The line connector according to claim 1, wherein the attachment part and the connecting sleeve form a sealing connection at an outer circumference of the attachment part.

11. The line connector according to claim 1, wherein in the assembled state, the pipe adapter part and the connecting sleeve are securely connected with one another at least in axial and radial direction via a securement provided at a circumference of the pipe adapter part and the connecting sleeve.

12. The line connector according to claim 11, wherein the securement at the connecting sleeve and the pipe adapter part permit the connecting sleeve to be rotated freely on the pipe adapter part.

13. The line connector according to claim 11, wherein the securement at the connecting sleeve and the attachment part fixates the connecting sleeve in torsion-proof manner on the attachment part.

14. The line connector according to claim 1, wherein the pipe adapter part and the connecting sleeve form a sealing connection at an outer circumference of the attachment part and/or at an inner circumference of the connecting sleeve.

15. The line connector according to claim 1, wherein at an end facing away from the attachment part, the pipe adapter part has an insertion stub in the form of an outer connecting element configured to connect with the outer pipe, wherein the insertion stub has a toothed tube connection.

16. The line connector according to claim 1, wherein at an end facing away from the attachment part, the pipe adapter part has a sleeve connecting piece in the form of an outer connecting element, which has an inner circumference that is adapted to the outer circumference of the outer pipe and forms a firmly bonded connection between the outer connecting element and the outer pipe.

17. The line connector according to claim 1, wherein an outer diameter of the attachment part includes a sealing groove and the outer diameter is larger than an outer diameter of the pipe adapter part in a region also having a sealing groove.

18. A line set comprising a pipe-in-pipe line and at least one line connector arranged at one end of the pipe-in-pipe line and having the characteristics of claim 1.

19. The line connector according to claim 1, wherein the attachment part and the connecting sleeve form a sealing connection at an inner circumference of the connecting sleeve.

20. A line connector with two mutually separate flow paths for connecting a pipe-in-pipe line having a first line and a second line, the line connector comprising:

an attachment part, a pipe adapter part and a connecting sleeve as individual components;

the attachment part including a first attachment element and an inner connecting element unitarily formed therewith, the inner connecting element being an inner cylindrical extension configured to connect to an inner pipe of the pipe-in-pipe line, the first attachment element being a first cylindrical extension configured for attachment to the first line, and a flow path from the inner line to the first line being defined through the attachment part;

the pipe adapter part including a unitarily formed outer connecting element being an outer cylindrical extension configured for connecting to an outer pipe of the pipe-in-pipe line;

the connecting sleeve including a second attachment element unitarily formed thereon as a second cylindrical extension that is configured for attaching the second line to a flow path of the outer pipe, the connecting sleeve connecting the attachment part to the pipe adapter part, and wherein the connecting sleeve is configured at both sides to, in the unassembled state, be pushed over the outer pipe, and at the end facing toward the attachment part be pushed over the pipe adapter part and onto the attachment part;

an access space provided between the attachment part and the pipe adapter part and configured to provide access to the inner connecting element and the inner pipe for producing a welded connection, wherein, in an unassembled state, the space can be accessed from the outside by pushing the connecting sleeve over the pipe adapter part in the direction of the outer pipe and, in an assembled state, and the space can be closed by pushing the connecting sleeve over the pipe adapter part onto the attachment part; and wherein the inner connecting element extends from the attachment part over the entire axial length of the access space to an opening of the pipe adapter part facing the attachment part.

* * * * *